United States Patent [19]

Wells

[11] Patent Number: 5,005,030

[45] Date of Patent: Apr. 2, 1991

[54] HAND HELD CAMERA STEADYING DEVICE

[76] Inventor: David L. Wells, 3881 Constitution Way, Boise, Id. 83706

[21] Appl. No.: 529,322

[22] Filed: May 29, 1990

[51] Int. Cl.⁵ .............................................. G03B 17/00
[52] U.S. Cl. ...................................... 354/82; 352/243
[58] Field of Search ........................... 354/81, 82, 293; 352/243

[56] References Cited

U.S. PATENT DOCUMENTS

| | | | |
|---|---|---|---|
| 2,239,201 | 4/1941 | Pyzel | 354/81 |
| 2,667,321 | 1/1954 | Pasturczak | 352/243 X |
| 4,158,488 | 6/1979 | Gottschalk et al. | 352/243 |
| 4,306,790 | 12/1981 | Adams | 352/82 |

*Primary Examiner*—Michael L. Gellner
*Attorney, Agent, or Firm*—Frank J. Dykas; Craig M. Korfanta

[57] ABSTRACT

A camera steadying device (10) is disclosed which includes a motorized flywheel (14) for creating an inertial moment which tends to oppose sudden movements and vibrations, thereby substantially reducing or eliminating "camera shake." Flywheel (14) is housed within flywheel chamber (30) in main housing (11). A camera mounting platform (12) is attached to housing (11) via an adjustable articulated joint (13). Adjustable articulated joint (13) enables the angle of housing (11), with respect to camera mounting platform (12), to be adjusted such that no portion of camera steadying device (10) appears within the field of vision of an attached camera.

7 Claims, 6 Drawing Sheets

HAND HELD CAMERA STEADYING DEVICE

BACKGROUND OF THE INVENTION

1. Technical Field

This invention generally relates to devices for holding cameras, such as tripods and the like, and in particular it relates to a holding and steadying device for cameras which includes an inertia means for resisting sudden movements and camera shake.

2. Background Art

Since the inventions of still photography and motion pictures, both photographers and cinematographers alike have been plagued by camera shake. Camera shake is caused by the inability of the photographer or cinematographer to hold a camera steady in certain situations.

In still photography it is especially important to hold the camera absolutely steady when using a slow shutter speed, i.e. for a long exposure, and/or when using a long focal length lens. The general rule of thumb is that the shutter speed should be equal or faster than the inverse of the focal length. For example, when using a 500 mm lens, one should use a shutter speed of at least 1/500th of a second. Depending upon the light sensitivity, or "speed" of the film, this can be virtually impossible since one would have to have a wider aperture than what is available on the lens. Consequently the photographer must resort to attaching the camera to a tripod and slowing the shutter speed down. Using a tripod makes a photographing moving objects very difficult. Additionally, tripods are generally cumbersome and require substantial set up time, making spontanneous shots very difficult to capture.

In cinematography, especially with the event of the hand held portable video cameras and mini video cameras, the product of camera shake can be likened to watching a movie photographed from a roller coaster. It is especially hard for a cinematographer or home video enthusiast to hold a smaller format video cameras, such as an 8 mm format video camera, and keep the camera from shaking and bouncing.

There is a natural tendency, especially among home video cinematographers, to move too fast when following a moving object, producing jerky motions rather than smooth slow transitions. Jerky fast movements, coupled with camera shake, produce results which can be very aggravating to the final viewer.

Prior to the instant invention, belt or shoulder strap mounted tripods, some including body braces or other various steadying restraints offered only a partial solution to these problems. One particularly complicated support device, intended for the professional cinematographer, is disclosed in U.S. Pat. No. 4,158,488, to Gottschalk, et al. This device uses an articulated pneumatically cushioned arm to support the camera on the cinematographer using shoulder straps and a belt member. Obviously this device is not well suited for the average home photographer or cinematographer as it is both complicated and expensive.

Adams, U.S. Pat. No. 4,306,790, discloses a hand held camera support which includes a pistol type grip and a V-shaped brace member. The V-shaped brace has diverging legs and cushion elements for bracing the support against the chest of a user. This device is much more compact and portable than the Gottschalk device, however it is also less effective at eliminating unwanted vibrations which cause camera shake. Neither of these devices, nor any of the prior art of which the inventor is aware, teach a camera support device which naturally resists jerky, vibrational and/or sudden movements of the camera.

What is needed is highly portable and compact device for hand holding a video or still camera which is capable of resisting sudden movements and which promotes slower and more methodical movements on the part of the photographer or cinematographer, and which virtually eliminates camera shake. Accordingly, it is an object of the present invention to provide a hand held camera support which fulfills these needs.

DISCLOSURE OF INVENTION

These and other objects are accomplished by a hand held camera steadying device which includes an inertia means for creating an inertial moment in the direction of the field of view of an attached camera for naturally resisting sudden movements. The instant camera steadying device includes a tripod type mounting platform for attaching either still or motion picture cameras via a standard thumb screw type attachment. The tripod platform is articulately attached to a main housing which includes a contoured grip handle. A motorized flywheel is suspended within the housing to produce an inertial moment about its axis. The housing is vented to allow air circulation for cooling the flywheel motor. The flywheel motor is an electric motor which derives its power from an external battery pack. It should be noted that the battery pack could be attached to or within the housing, or alternatively, the electric motor could be driven from an auxiliary power takeoff from the attached camera.

Additionally, a trigger mechanism can be included within the contoured grip handle on the housing for activating both electronic and mechanical shutters of an attached camera.

BEST MODE FOR CARRYING OUT INVENTION

Figure 1:
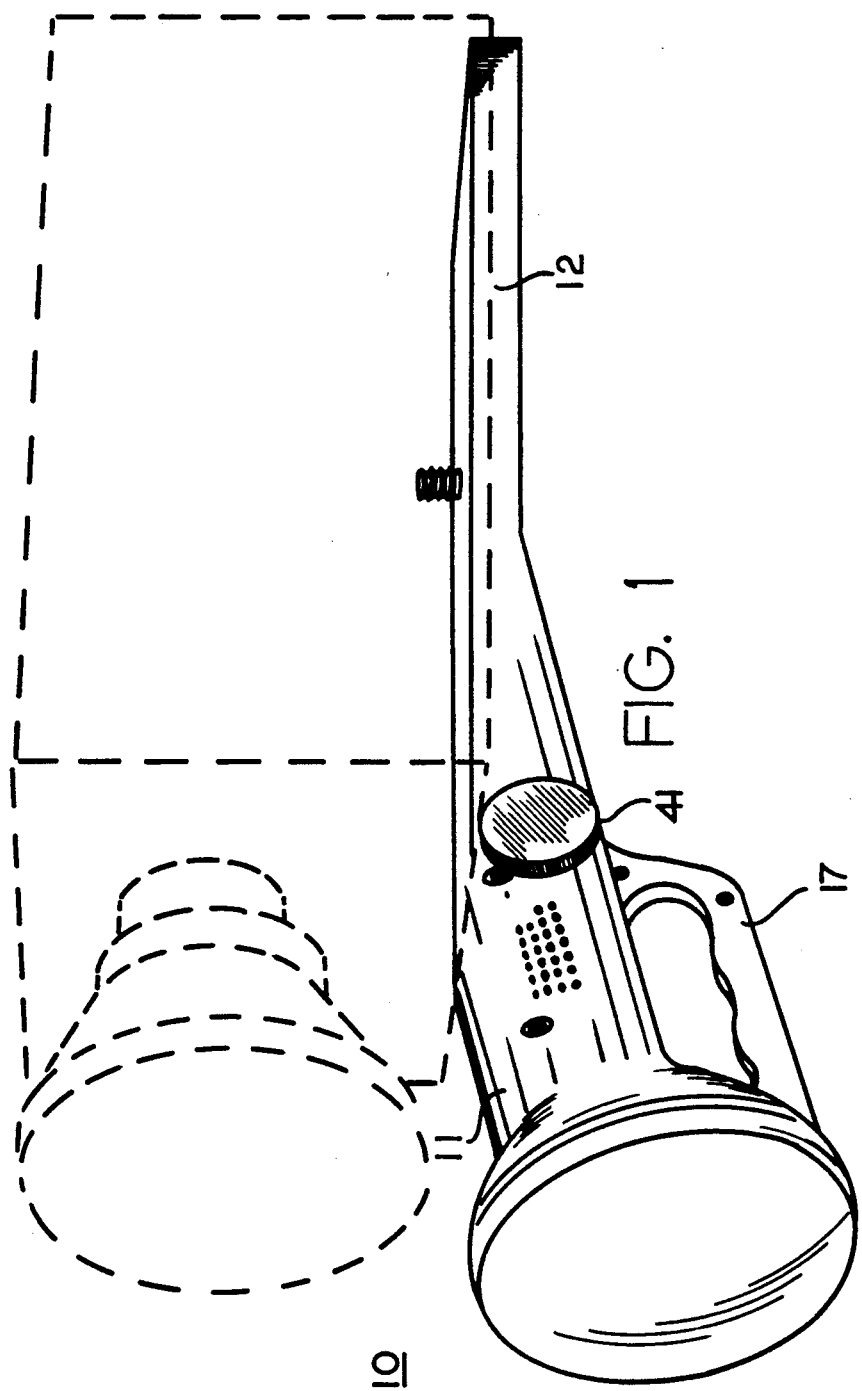
FIG. 1 is a three-quarter elevation view of the camera steadying device.
Figure 2:
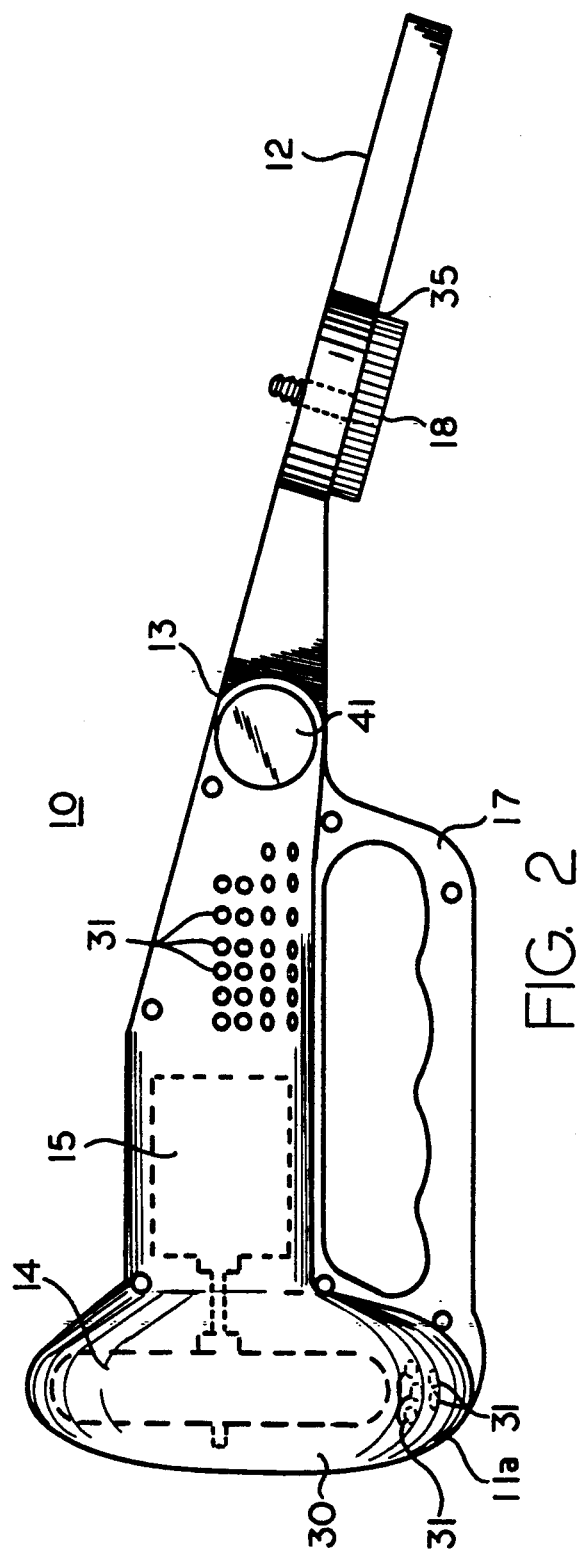
FIG. 2 is a right side view of the camera steadying device.
Figure 3:
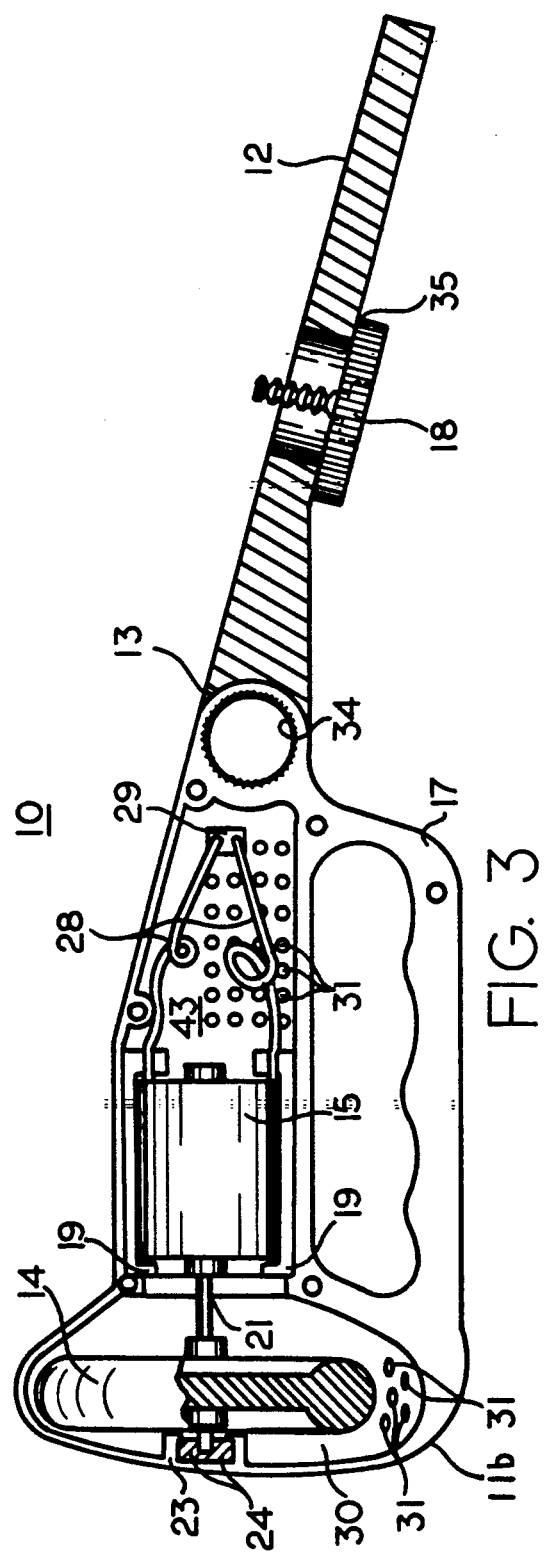
FIG. 3 is a right side view of the camera steadying device having the left housing half removed.
Figure 4:
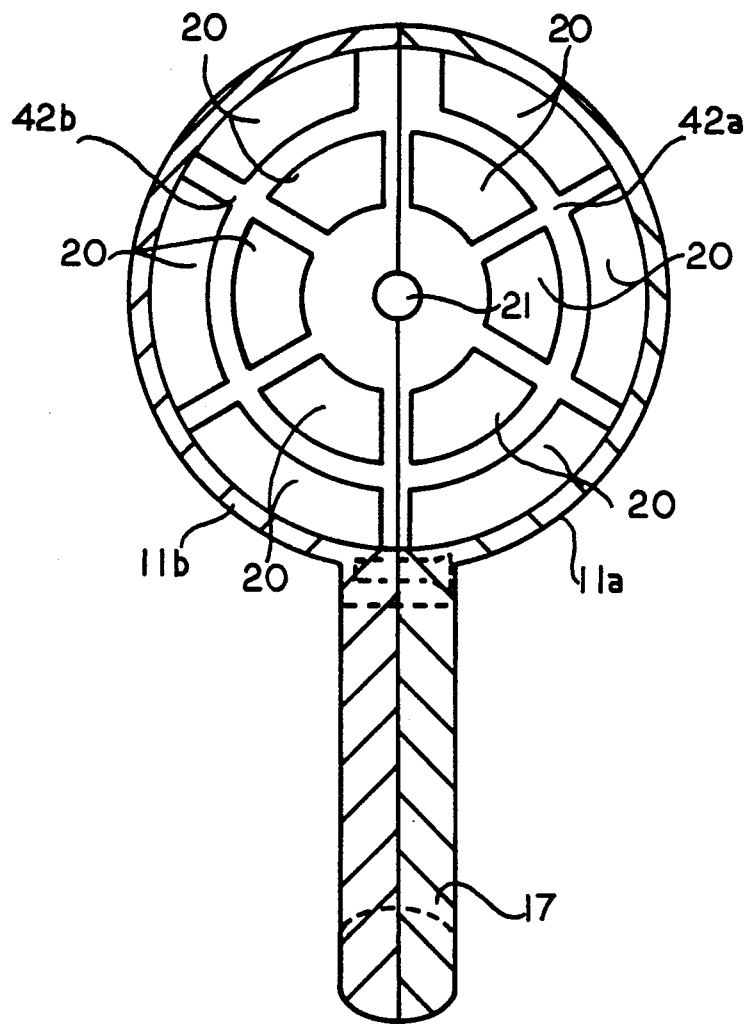
FIG. 4 is a front sectional view taken along section line 4 of FIG. 3.
Figure 5:
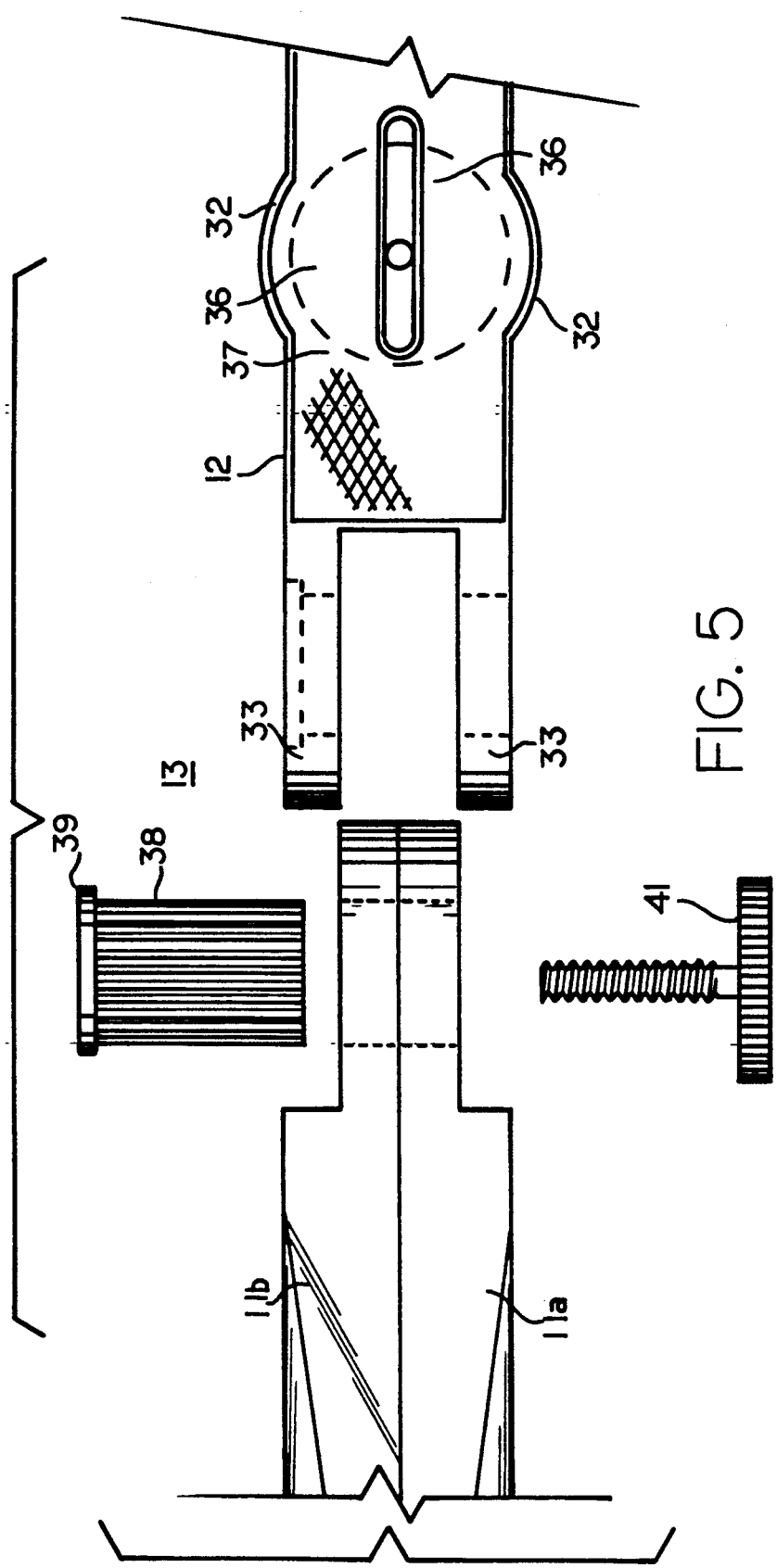
FIG. 5 is a top view of the camera steadying device.
Figure 6:
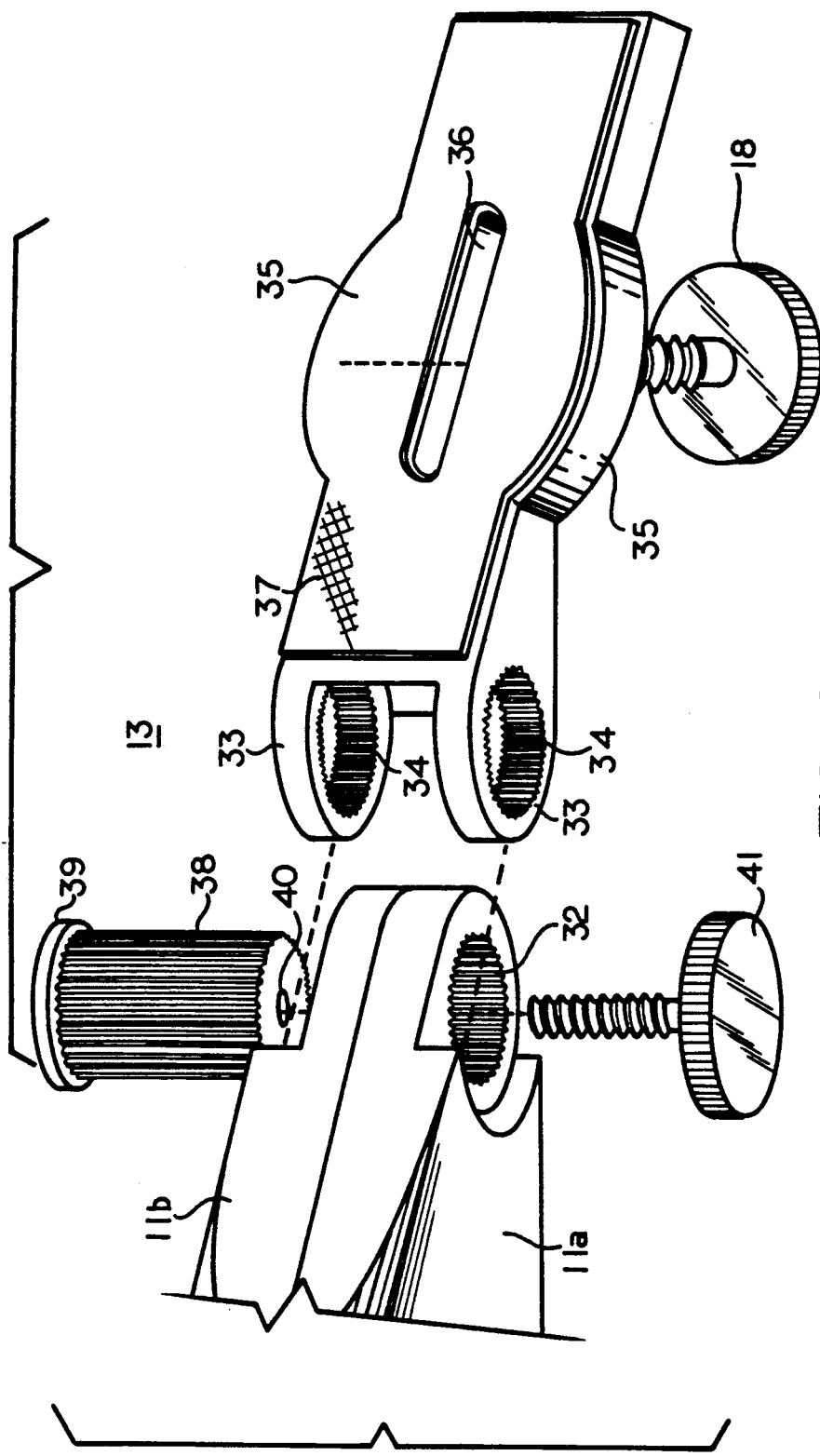
FIG. 6 is a three-quarter exploded elevation assembly drawing showing the articulated joint assembly and the camera mounting platform in detail.

As is shown in FIGS. 1-6, the camera steadying device 10 includes a camera mounting platform 12 being articulately attached to housing 11, which includes a motorized flywheel 14 as a means for creating an inertial moment for naturally resisting sudden and/or vibrational type movements. Camera mounting platform 12 includes a tripod mount thumb screw 18 for attaching still cameras, movie cameras, video cameras, and the like. Adjustable articulated joint 13 is provided to dispose the front portion of housing 11, out of the field of view of the camera.

Housing 11 is constructed from right and left housing halves 11a and 11b which are symmetrical and mirror image constructions of one another. A small electric motor 15 is attached within right and left housing halves 11a and 11b within motor mounts 19. Motor mounts 19 are fin like structures, formed within their respective housing halves 11a and 11b, to suspend motor 15 centrally within housing 11 and allow air to circulate around motor 15. Here housing halves 11a and 11b are manufactured from injection molded plastic, however it should be apparent that any suitable construction could be used. Motor 15 is attached within motor mounts 19 such that a shaft of the motor penetrates shaft hole 21 and attaches on its forward end to flywheel 14. Front bearing recess 23 is disposed to be coaxially aligned with shaft hole 21 and configured for holding shaft bearing 24. While here the gear ratio between motor 15 and flywheel 14 is 1:1 because of the direct connection between the two, it should be noted that gearing could be added by attaching the flywheel to a separate shaft, driven by gears, to optimize the configuration to provide the maximum rpm to flywheel 14 taking into account power consumption, the mass and configuration of the flywheel and the effects of precession.

A plurality of vent holes 20 are provided in right and left grid arrays 42a and 42b, as are shaft hold 21, while a plurality of housing vent holes 31 are provided within flywheel chamber 30 and wiring chamber 43. Wiring chamber 43 provides a housing for power supply wires 28 which are connected between motor 15 and power jack 29. Power jack 29 is configured to attach motor 15 to an external battery pack which could be worn on the belt of the user. Additionally, an auxiliary power take-off from an attached camera could be utilized to power motor 15.

Housing members 11a and 11b include a lower extending handle 17 having a contoured grip, thereby providing a convenient and comfortable way to hold camera steadying device 10. A serrated receiving cylinder 32 is formed on the rear end of right and left side housings 11a and 11b to form a portion of adjustable articulated joint 13. A second portion of adjustable articulated joint 13 is formed by a pair of side ring extensions 33 on camera mounting platform 12. Both side ring extensions 33 have serrated edged holes 34 which have an identical number of serrations, or teeth, as does serrated receiving cylinder 32, and are of the same inside diameter. A serrated drum 38 has an outside diameter approximately equal to the inside diameter of serrated receiving cylinder 32 and serrated edged holes 34, as well as an identical number of teeth. Additionally, serrated drum 38 has a stop flange 39 radially extending around one end and a threaded bore 40 penetrating its other end for receiving locking thumb screw 41.

Camera mounting platform 12 is attached to serrated receiving cylinder 32 by aligning the holes 34 in side ring extensions 33 with receiving cylinder 32 and inserting serrated drum 38 therethrough. Locking thumb screw 41 is then threadedly engaged within bore 40 and tightened to dispose camera mounting platform 12 at the desired angle with respect to housing 11. While the aforementioned configuration provides a strong, positive articulated joint between the camera platform 12 and housing 11, it should be apparent that other articulated joining mechanisms could be implemented.

Camera platform 12 includes an annular tripod surface 35 having a tripod mount thumb screw 18 rotatably attached therein. A vibration pad 37, such as a neoprene cushion, is attached along the upper surface of camera mounting platform 12 and around annular tripod surface 35. Vibration pad 37 acts to dampen any smaller vibrations not counteracted by the inertial moment of flywheel 14.

In use, a photographer or cinematographer simply has to attach his or her camera to the camera mounting platform 12 via tripod mount thumb screw 18. The angle of articulated joint 13 is then adjusted such that no portion of camera steadying device 10 is present in the field of view of the attached camera. External power is then supplied to motor 15 via power jack 29 from whatever power source the user desires. Once activated, the rotating flywheel creates an inertial moment about its axial which tends to counteract or "absorb" sudden movements, thereby aiding the photographer in holding the attached camera steady.

While there is shown and described the present preferred embodiment of the invention, it is to be distinctly understood that this invention is not limited thereto but may be variously embodied to practice within the scope of the following claims.

I claim:
1. A camera steadying device which comprises:
   a housing;
   attachment means for attaching said housing to a camera; and
   inertia means housed by said housing for creating a moment of inertia to resist sudden movements of an attached camera.
2. The camera steadying device of claim 1 wherein said inertia means comprises:
   a flywheel; and
   rotation means being operably attached to said flywheel for rotationally driving the same.
3. The camera steadying device in claim 2 wherein said housing further comprises a handle grip being configured to be comfortably held by a user to aid in steadying an attached camera.
4. The camera steadying device of claim 3 wherein said attachment means comprises:
   a camera mounting platform being attached to said housing via a pivotal joint to provide an angular adjustment between said housing and said platform for positioning said housing in an unobtrusive position out of the way of an attached camera;
   said platform having a tripod mounting hold therein for receiving a tripod mount thumb screw; and
   a tripod mount thumb screw being engaged in said hold for threadedly attaching a camera to said platform.
5. The camera steadying device of claim 2 wherein said attachment means comprises:
   a camera mounting platform being attached to said housing via a pivotal joint to provide an angular adjustment between said housing and said platform for positioning said housing in an unobtrusive position out of the way of an attached camera;
   said platform having a tripod mounting hole therein for receiving a tripod mount thumb screw; and
   a tripod mount thumb screw being engaged in said hole for threadedly attaching a camera to said platform.
6. The camera steadying device of claim 1 wherein said attachment means comprises:
   a camera mounting platform being attached to said housing via a pivotal joint to provide an angular adjustment between said housing and said platform for positioning said housing in an unobtrusive position out of the way of an attached camera;

said platform having a tripod mounting hole therein for receiving a tripod mount thumb screw; and a tripod mount thumb screw being engaged in said hole for threadedly attaching a camera to said platform.

7. The camera steadying device of claim 1 wherein said housing further comprises a handle grip being configured to be comfortably held by a user to aid in steadying an attached camera.

* * * * *